(12) United States Patent
Wang et al.

(10) Patent No.: US 8,837,310 B2
(45) Date of Patent: Sep. 16, 2014

(54) METHOD AND SYSTEM FOR DETERMINING AN END TIME OF UPLINK BACK PROPAGATION

(75) Inventors: Dafei Wang, Guangdong Province (CN); Delong Tang, Guangdong Province (CN); Xiaoan Hou, Guangdong Province (CN); Miao Li, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 239 days.

(21) Appl. No.: 13/259,312

(22) PCT Filed: Mar. 24, 2010

(86) PCT No.: PCT/CN2010/071252
§ 371 (c)(1),
(2), (4) Date: Feb. 29, 2012

(87) PCT Pub. No.: WO2010/148681
PCT Pub. Date: Dec. 29, 2010

(65) Prior Publication Data
US 2013/0121171 A1 May 16, 2013

(30) Foreign Application Priority Data
Jun. 25, 2009 (CN) .......................... 2009 1 0150281

(51) Int. Cl.
H04W 36/02 (2009.01)
H04W 28/10 (2009.01)
H04L 12/801 (2013.01)
H04J 3/06 (2006.01)
H04W 28/14 (2009.01)
H04W 24/00 (2009.01)
H04W 92/04 (2009.01)

(52) U.S. Cl.
CPC .............. *H04W 24/00* (2013.01); *H04W 28/10* (2013.01); *H04L 47/34* (2013.01); *H04W 36/02* (2013.01); *H04W 92/045* (2013.01); *H04J 3/06* (2013.01); *H04W 28/14* (2013.01)
USPC ........................................................ 370/252

(58) Field of Classification Search
CPC ..................................................... H04W 36/02
See application file for complete search history.

(56) References Cited

U.S. PATENT DOCUMENTS

| 7,327,734 | B2 | 2/2008 | Yi et al. |
| 2003/0007490 | A1 | 1/2003 | Yi et al. |

FOREIGN PATENT DOCUMENTS

| CN | 1396782 A | 2/2004 |
| CN | 101330492 A | 12/2008 |

OTHER PUBLICATIONS

Technical Specification Group radio Access Network, Evolved Universal Terrestrial Radio Access(E-UTRA) and Evolved Universal Terresrial Radio access network (E-UTRAN), 3rd Generation Partnership Project (3GPP) (Jul. 2008), V8.5.0, pp. 14, 46, 81, 103.*
Technical Specification Group Radio Access Network; Evolved Universal Terrestrial Radio Access (E-UTRA) and Evolved Universal Terrestrial Radio Access Network (E-UTRAN); 3rd Generation Partnership Project (3GPP) (May 2008).

* cited by examiner

*Primary Examiner* — Huy D Vu
*Assistant Examiner* — Bao G Nguyen
(74) *Attorney, Agent, or Firm* — Scully, Scott, Murphy & Presser, P.C.

(57) ABSTRACT

The invention provides a method and a system for determining an end time of uplink back propagation in a mobile communication system to solve a problem of accurately judging the end time of uplink back propagation, wherein the method includes the following steps: sending data with consecutive sequence numbers in a buffer of a packet data convergence protocol (PDCP) module to a serving gateway (S-GW) via an S1 tunnel; sending data with inconsecutive sequence numbers, which is from data with a first inconsecutive sequence number to last data in the buffer of the PDCP module, to a target base station via an uplink back propagation tunnel; generating an end marker datagram; sending the end marker datagram to the target base station via the uplink back propagation tunnel; and receiving, by the target base station, the end marker datagram and determining that the uplink back propagation has ended.

14 Claims, 6 Drawing Sheets

METHOD AND SYSTEM FOR DETERMINING AN END TIME OF UPLINK BACK PROPAGATION

FIELD OF THE INVENTION

The present invention relates to the mobile communication field, and in particular to a method and a system for determining an end time of uplink back propagation.

BACKGROUND OF THE INVENTION

Protocol 36.300 of Evolved Universal Terrestrial Radio Access (E-UTRA) and Evolved Universal Terrestrial Radio Access Network (E-UTRAN) describes detailed processes of handover. Since radio resources are precious, no matter handover based on X2 or handover based on S1, uplink back propagation is required in order to reduce retransmission of air interface data. The processes related to handover comprise the following steps.

After a source evolved universal mobile telecommunications system (UMTS) terrestrial radio access network (E-UTRAN) Node B (eNB) sends a handover command to a user equipment (UE), a control plane of the source eNB initiates a re-establishment command to a user plane; and the user plane re-establishes the radio link control (RLC) and the packet data convergence protocol (PDCP) instances after receiving the message. During the re-establishment process, the RLC forms data in a buffer into PDCP protocol data unit(s) (PDU) and then delivers all of them to a buffer of the PDCP, and directly discards datagram fragments if the fragments cannot be formed into PDU(s). The PDCP module processes PDUs with consecutive sequence numbers (SN) in the buffer as service data units (SDU) and then directly sends the same to a serving gateway (S-GW) of a core network via an S1 tunnel of a GTPU (general packet radio service (GPRS) tunnel protocol user plane); and the PDCP module processes PDUs with inconsecutive SNs (from a PDU with a first inconsecutive SN to the last PDU in the buffer) in the buffer as SDUs and then sends the same to a target eNB via an X2 uplink back propagation tunnel of the GTPU. After receiving the uplink back propagation datagram, a GTPU at the target eNB directly delivers it to the PDCP; and then the PDCP module stores the data in a reordering buffer. The source eNB sends a sequence number status transmission message to the target eNB, wherein the message carries loss information of the datagrams received by the source PDCP; the target eNB constructs a status report after receiving the message and then sends the status report to the UE to notify the UE which datagrams have to be retransmitted due to loss; and the PDCP module of the target eNB receives the retransmitted datagrams from the UE, then reorders the retransmitted datagrams and the datagrams in the reordering buffer, and finally sends the consecutive datagrams to the S-GW. Introduction of processes of uplink back propagation reduces repeated delivery of air interface data and saves air interface resources.

The protocol describes the processes of uplink back propagation, however, it has not specified an end time for the uplink back propagation. In the conventional art, an uplink back propagation tunnel of a source base station will be released after a resource release command from a target base station is received; and the target base station will start a timer after receiving the first uplink back propagation datagram, after the timer is timed out, it will be deemed that the transmission of uplink back propagation data ends and the uplink back propagation tunnel will be released.

The conventional art uses a most popular timer strategy, which is an empirical method. Since the timer cannot be adjusted freely during usage, it is unable to be adapted to changes of network transmission conditions and situations. If the uplink back propagation tunnel is released too early, the uplink back propagation data not transmitted completely may be lost during the transmission; whereas, if the uplink back propagation tunnel of the GTPU of the source eNB is still not released after the handover, waste of resources will be caused. Therefore, it is very important to accurately judge the end time of the uplink back propagation.

SUMMARY OF THE INVENTION

The main object of the present invention is to provide a method and a system for determining an end time of uplink back propagation, and to provide an uplink back propagation method in a mobile communication system, so as to solve the above problem.

The embodiments of the present invention provides a method for determining an end time of uplink back propagation in a mobile communication system, and the method comprises the following steps: sending data with consecutive sequence numbers in a buffer of a packet data convergence protocol (PDCP) module to a serving gateway (S-GW) via an S1 tunnel; sending data with inconsecutive sequence numbers, which is from data with a first inconsecutive sequence number to last data in the buffer of the PDCP module, to a target base station via an uplink back propagation tunnel; generating an end marker datagram; sending the end marker datagram to the target base station via the uplink back propagation tunnel; and receiving, by the target base station, the end marker datagram and determining that the uplink back propagation has ended.

In the above, the target base station is an evolved base station.

The embodiments of the present invention also provides a system for determining end time of uplink back propagation in a mobile communication system, comprising a source base station and a target base station, wherein the source base station comprises: a consecutive data sending unit, configured to send data with consecutive sequence numbers in a buffer of a packet data convergence protocol (PDCP) module to a serving gateway via an S1 tunnel, an inconsecutive data sending unit, configured to send data with inconsecutive sequence numbers, which is from data with a first inconsecutive sequence number to last data in the buffer of the PDCP module, to a target base station via an uplink back propagation tunnel, and an end marker datagram sending unit, configured to generate an end marker datagram, and to send the end marker datagram to the target base station via the uplink back propagation tunnel; and a destination base station is configured to receive the end marker datagram and determine that the uplink back propagation has ended.

In the above, the source base station also comprises a storage unit, as the buffer of the PDCP module, configured to store the data with consecutive sequence numbers and the data with inconsecutive sequence numbers.

In the above, the target base station comprises: a datagram type judging unit, configured to judge a type of a received datagram; and a datagram processing unit, configured to, when the received datagram is a data datagram, store the data datagram to a reordering buffer; and when the received datagram is an end marker datagram, release the uplink back propagation tunnel.

In the above, the target base station is an evolved base station.

The embodiments of the present invention are to release the uplink back propagation tunnel when it is determined that the uplink back propagation has ended.

The embodiments of the present invention provides an uplink back propagation method in a mobile communication system, comprising the following steps: sending data in a buffer of a radio link control (PLC) module to a buffer of a packet data convergence protocol (PDCP) module; sending data with consecutive sequence numbers in the buffer of the PDCP module to a serving gateway via an S1 tunnel; sending data with inconsecutive sequence numbers, which is from data with a first inconsecutive sequence number to last data in the buffer of the PDCP module, to a target base station via an uplink back propagation tunnel; generating an end marker datagram; sending the end marker datagram to the target base station via the uplink back propagation tunnel; and receiving, by the target base station, the end marker datagram and releasing the uplink back propagation tunnel.

In the above, the steps of receiving the end marker datagram and releasing the uplink back propagation channel comprises the following sub-steps: judging a type of a received datagram; when the received datagram is a data datagram, storing the data datagram to a reordering buffer; and when the received datagram is an end marker datagram, releasing the uplink back propagation tunnel.

In the above, after sending the data in the buffer of the RLC module to the buffer of the PDCP module, if the RLC module receives uplink data from a bottom layer again, the RLC module discards the uplink data.

In the above, the target base station is an evolved base station.

Through implementation of the method and the system in the invention, the uplink back propagation end time can be judged accurately, and thus the release of the uplink back propagation tunnel can be executed timely to ensure that the uplink back propagation data will not be lost during transmission (i.e., releasing the uplink back propagation tunnel too early is avoided), so as to achieve lossless handover, and at the same time, the tunnel resource can be released in time after the back propagation data transmission ends (i.e., releasing the uplink back propagation tunnel too late is avoided), thereby avoiding resource waste.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

In order to make the technical solution and advantages of the present invention more clear, the present invention will be described in details hereinafter with reference to drawings.

Figure 1:
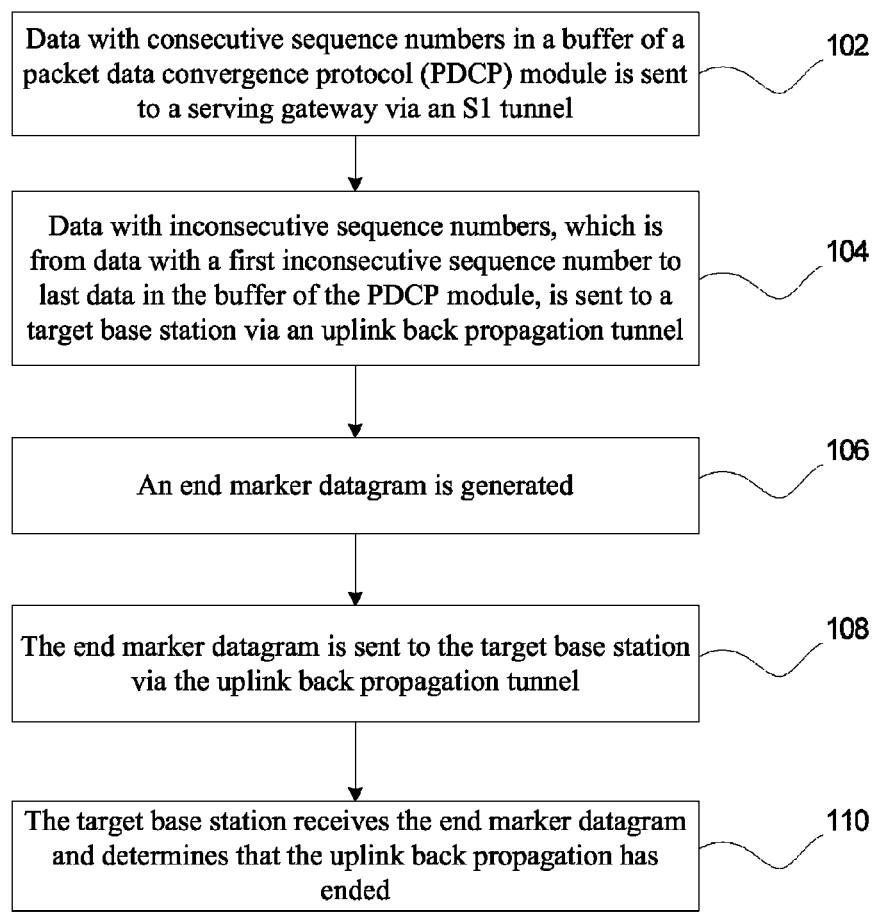
FIG. 1 is a flow chart of a method for determining an end time of uplink back propagation in a mobile communication system provided in the embodiments of the present invention.

As shown in FIG. 1, the present embodiment provides a method for determining an end time of uplink back propagation in a mobile communication system, which comprises the following steps 102 to 110.

Step 102: Data with consecutive sequence numbers in a buffer of a packet data convergence protocol (PDCP) module is sent to a serving gateway via an S1 tunnel.

Step 104: Data with inconsecutive sequence numbers, which is from data with a first inconsecutive sequence number to last data in the buffer of the PDCP module, is sent to a target base station via an uplink back propagation tunnel.

Step 106: An end marker datagram is generated.

Step 108: The end marker datagram is sent to the target base station via the uplink back propagation tunnel.

Step 110: The target base station receives the end marker datagram and confirms that the uplink back propagation has ended.

Preferably, the target base station is an eNB.

The above steps 102 to 108 are executed by a source base station with modules or units thereon.

In the present embodiment, by sending an end marker datagram to the destination base station, the end time of the uplink back propagation is defined, such that the uplink back propagation tunnel is released by the destination base station reasonably and the integrity of the received information is guaranteed.

Figure 2:
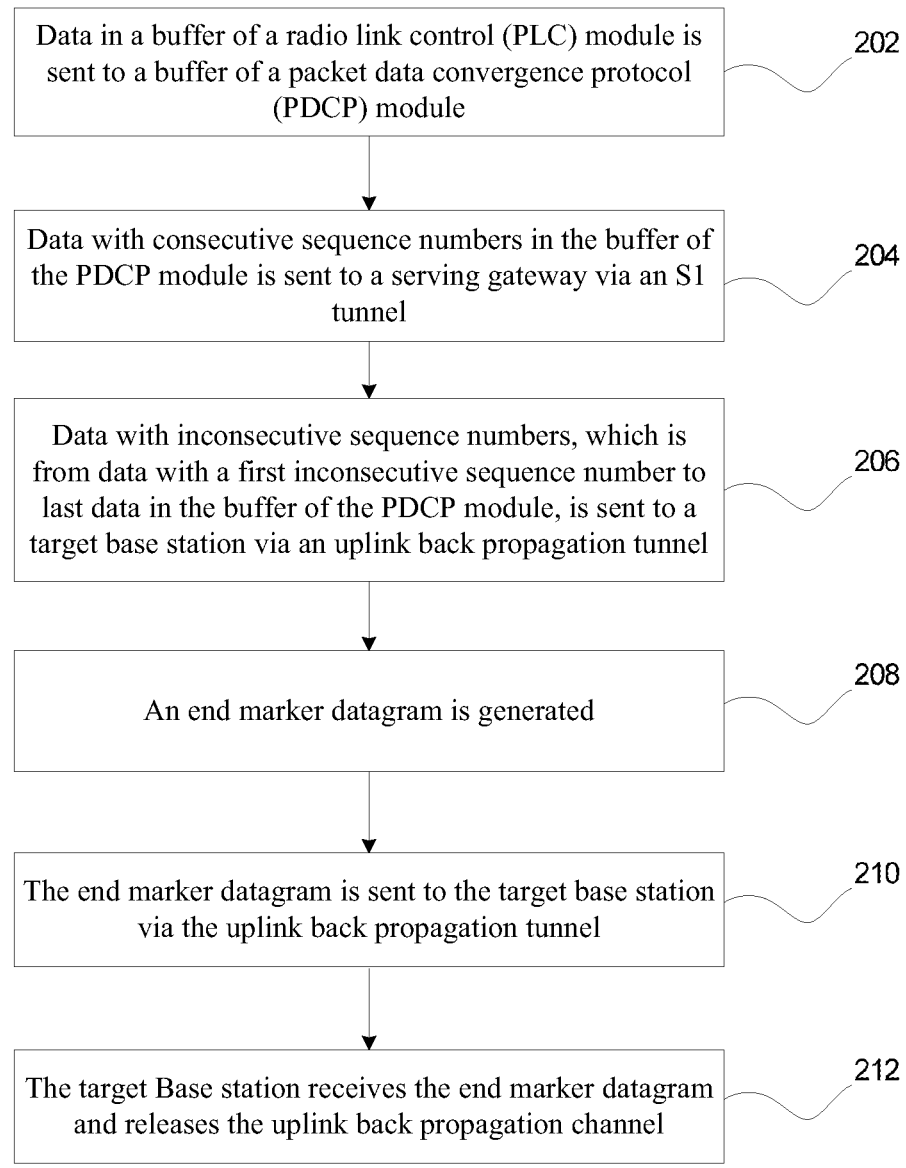
FIG. 2 is a flow chart of an uplink back propagation method in a mobile communication system provided in the embodiments of the present invention.

As shown in FIG. 2, the present embodiment provides an uplink back propagation method in a mobile communication system, which comprises the following steps 202 to 212.

Step 202: Data in a buffer of a radio link control (PLC) module is sent to a buffer of a packet data convergence protocol (PDCP) module.

Step 204: Data with consecutive sequence numbers in the buffer of the PDCP module is sent to a serving gateway via an S1 tunnel.

Step 206: Data with inconsecutive sequence numbers, which is from data with a first inconsecutive sequence number to last data in the buffer of the PDCP module, is sent to a target base station via an uplink back propagation tunnel.

Step 208: An end marker datagram is generated.

Step 210: The end marker datagram is sent to the target base station via the uplink back propagation tunnel.

Step 212: The target Base station receives the end marker datagram and releases the uplink back propagation tunnel.

By releasing the uplink back propagation tunnel after the target base station receives the end marker datagram, the present embodiment saves resources, such that the resources can be used properly.

Preferably, the Step 212 comprises: the target base station judging the type of a received datagram; when the received datagram is a data datagram, storing the data datagram to a reordering buffer; and when the received datagram is an end marker datagram, releasing the uplink back propagation tunnel.

Preferably, after the above Step 202, if the RLC module receives uplink data from a bottom layer again, the RLC module discards the uplink data.

Preferably, the target base station is an evolved Node B.

In the present embodiment, the source base station sends the end marker datagram; thus the target base station can accurately determine the end time of the uplink back propagation, such that the release of the uplink back propagation tunnel can be executed timely to ensure that the uplink back propagation data will not be lost during transmission (i.e., releasing the uplink back propagation tunnel too early is avoided), so as to achieve lossless handover, and at the same time, the tunnel resource can be released in time after the back propagation data transmission ends (i.e., releasing the uplink back propagation tunnel too late is avoided), thereby avoiding resource waste.

Figure 3:
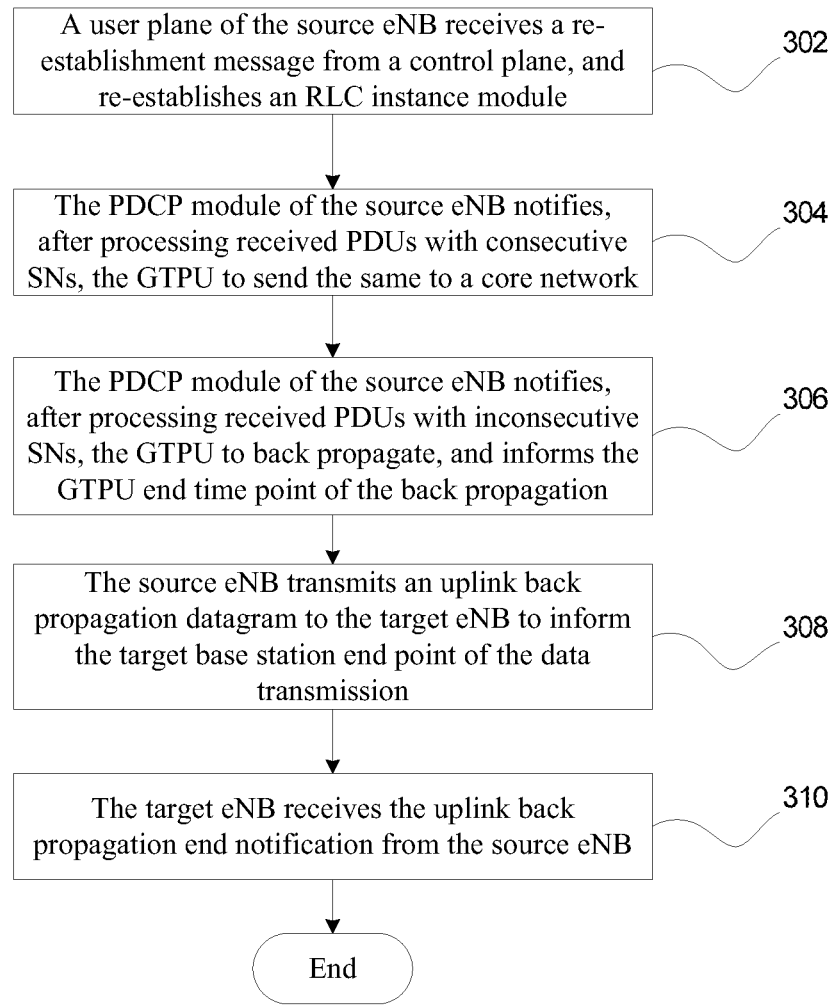
FIG. 3 is a flow chart of a method for determining end time of uplink back propagation in the embodiments of the present invention.

As shown in FIG. 3, after the source eNB sends a handover command to a UE, the following steps 302 to 310 have to be carried out.

Step 302: A user plane of the source eNB receives a re-establishment message from a control plane, and re-establishes an RLC instance module.

Step 304: The PDCP module of the source eNB notifies the GTPU, after processing the received PDUs with consecutive SN, to send the same to a core network.

Step 306: The PDCP module of the source eNB notifies the GTPU, after processing the received PDUs with inconsecutive SN, to back propagate, and informs the GTPU of the end time point of the back propagation.

Step 308: The source eNB transmits an uplink back propagation datagram to the target eNB to inform the target base station end point of the data transmission.

Step 310: The target eNB receives the uplink back propagation end notification from the source eNB; and the uplink back propagation flow ends.

In the above, the re-establishment flow of the RLC in the Step 302 is as follows: the RLC forms data in a buffer into PDCP PDU(s) and then delivers all the data to a buffer of the PDCP, and then if the RLC receives data from a bottom layer again, the RLC discards the uplink data and no longer delivers it to the PDCP.

In the above, in the Step 304, the flow that PDCP module of the source eNB notifies the GTPU, after processing the received PDUs with consecutive SNs, to send the same to a core network is as follows: the PDCP module delivers the SDUs to an S-GW of the core network via an S1 tunnel of the GTPU after processing PDUs with consecutive SNs in the buffer as SDUs.

In the above, in the Step 306, the method that the PDCP module of the source eNB notifies the GTPU, after processing the received PDUs with inconsecutive SNs, to back propagate, and informs the GTPU of the end time of the back propagation is as follows: the PDCP module delivers, after processing the PDUs from a PDU with a first inconsecutive SN to a last PDU in the buffer as SDUs, the SDUs to the target eNB via an uplink back propagation tunnel of the GTPU, and sends a message to the GTPU, after delivering a last SDU in the buffer to the GTPU, to notify that the transmission of the uplink back propagation data ends; the GTPU constructs, after receiving the message, a specific datagram indicating that the transmission ends, for example, an end marker datagram.

In the above, in the Step 308, the method that the source eNB transmits the uplink back propagation datagram to the target eNB to inform the target base station of the end point of the data transmission is as follows: the GTPU of the source eNB sends the uplink back propagation data to the target eNB via an X2 uplink back propagation tunnel, and sends, after the data transmission ends, the specific datagram indicating that the transmission ends.

In the above, in the Step 310, the method that the target eNB receives the uplink back propagation end notification from the source eNB is as follows: the GTPU of the target eNB receives a datagram from the uplink back propagation tunnel and then unpacks it, wherein if the datagram is a data datagram, the GTPU directly delivers it to the PDCP, and the PDCP module stores the data datagram to a reordering buffer; and if the datagram is a specific datagram indicating that the transmission ends, it indicates that the uplink back propagation ends, and the target eNB releases the uplink back propagation tunnel resources. In the present embodiment, the source base station sends the end marker datagram, thus the target base station can accurately determine the end time of the uplink back propagation, such that the release of the uplink back propagation tunnel can be executed timely to ensure that the uplink back propagation data will not be lost during transmission (i.e., releasing the uplink back propagation tunnel too early is avoided), so as to achieve lossless handover, and at the same time, the tunnel resource can be released in time after the back propagation data transmission ends (i.e., releasing the uplink back propagation tunnel too late is avoided), thereby avoiding resource waste.

Figure 4:
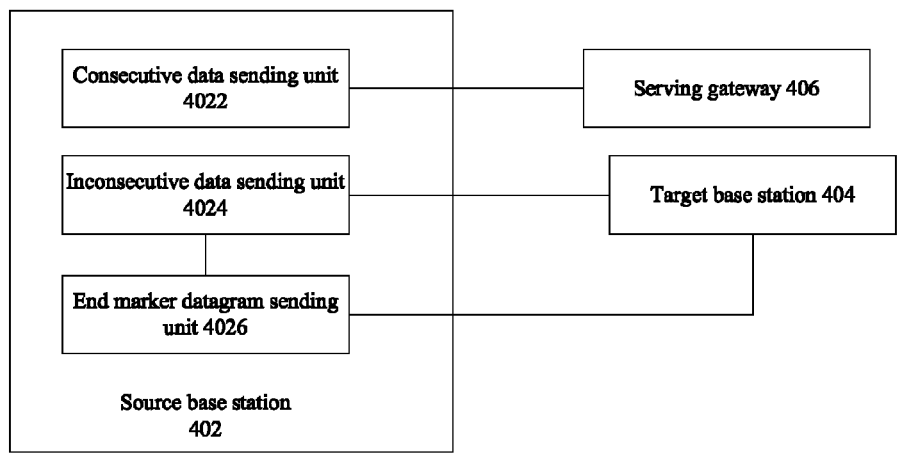
FIG. 4 is a block diagram of a system for determining end time of uplink back propagation in a mobile communication system provided in the embodiments of the invention.

The embodiments of the present invention also provides a system for determining the end time of uplink back propagation in a mobile communication system; and as shown in FIG. 4, the system comprises a source base station 402, a target base station 404, and a serving gateway 406, wherein, the source base station 402 comprises:

a consecutive data sending unit 4022, configured to send data with consecutive sequence numbers in a buffer of a packet data convergence protocol (PDCP) module to a serving gateway 406 via an S1 tunnel;

an inconsecutive data sending unit 4024, configured to send data with inconsecutive sequence numbers, which is from data with a first inconsecutive sequence number to the last data in the buffer of the PDCP module, to a target base station 404 via an uplink back propagation tunnel;

an end marker datagram sending unit 4026, configured to generate an end marker datagram, and to send the end marker datagram to the target base station 404 via the uplink back propagation tunnel, and wherein, the inconsecutive data sending unit 4024 is coupled to the end marker datagram sending unit 4026, the end marker datagram is generated after inconsecutive data are sent by the inconsecutive data sending unit 4024; and the target base station 404 is configured to receive the end marker datagram and to determine that the uplink back propagation has ended.

Preferably, the source base station 402 also comprises a storage unit, as the buffer of the PDCP module, configured to store data with consecutive sequence numbers and data with inconsecutive sequence numbers.

Preferably, the target base station 404 comprises: a datagram type judging unit, configured to judge the type of a received datagram; and a datagram processing unit, configured to store the data datagram to a reordering buffer when the received datagram is a data datagram, and to release the uplink back propagation tunnel when the received datagram is an end marker datagram.

The target base station 404 is an evolved Node B.

In the present embodiment, the source base station 402 sends the end marker datagram; thus the target base station 404 can accurately determine the end time of the uplink back propagation, such that the release of the uplink back propagation tunnel can be executed timely to ensure that the uplink back propagation data will not be lost during transmission (i.e., releasing the uplink back propagation tunnel too early is avoided), so as to achieve lossless handover, and at the same time, the tunnel resource can be released in time after the back propagation data transmission ends (i.e., releasing the uplink back propagation tunnel too late is avoided), thereby avoiding resource waste.

Figure 5:
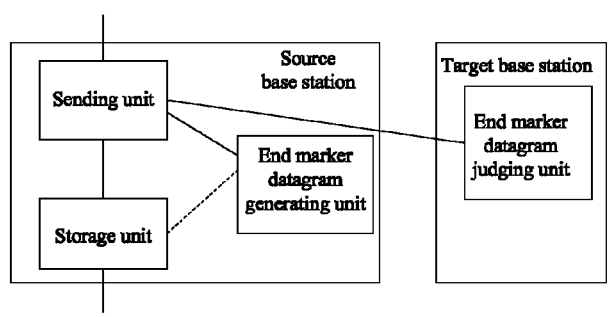
FIG. 5 is a block diagram of another system for determining end time of uplink back propagation in a mobile communication system provided in the embodiments of the invention.

The embodiments of the present invention also provides a base station device for determining end time of uplink back propagation, as shown in FIG. 5, which comprises:

an end marker datagram generating unit, arranged in the GTPU of a source base station, and configured to generate an end marker datagram when all data with inconsecutive sequence numbers has been received by the GTPU;

a sending unit, arranged in the GTPU of the source base station, and configured to send buffered PDCP data packets with consecutive sequence numbers to a core network via an S1 tunnel of the GTPU or to transmit buffered PDCP data packets with inconsecutive sequence numbers to the target base station via an uplink back propagation tunnel of the GTPU;

an end marker datagram judging unit, arranged in the target base station, and configured to judge whether a specific datagram indicating that transmission ends is received; and a storage unit, configured to buffering PDCP data packets to be sent to a core network or back propagated to the target base station.

Figure 6:
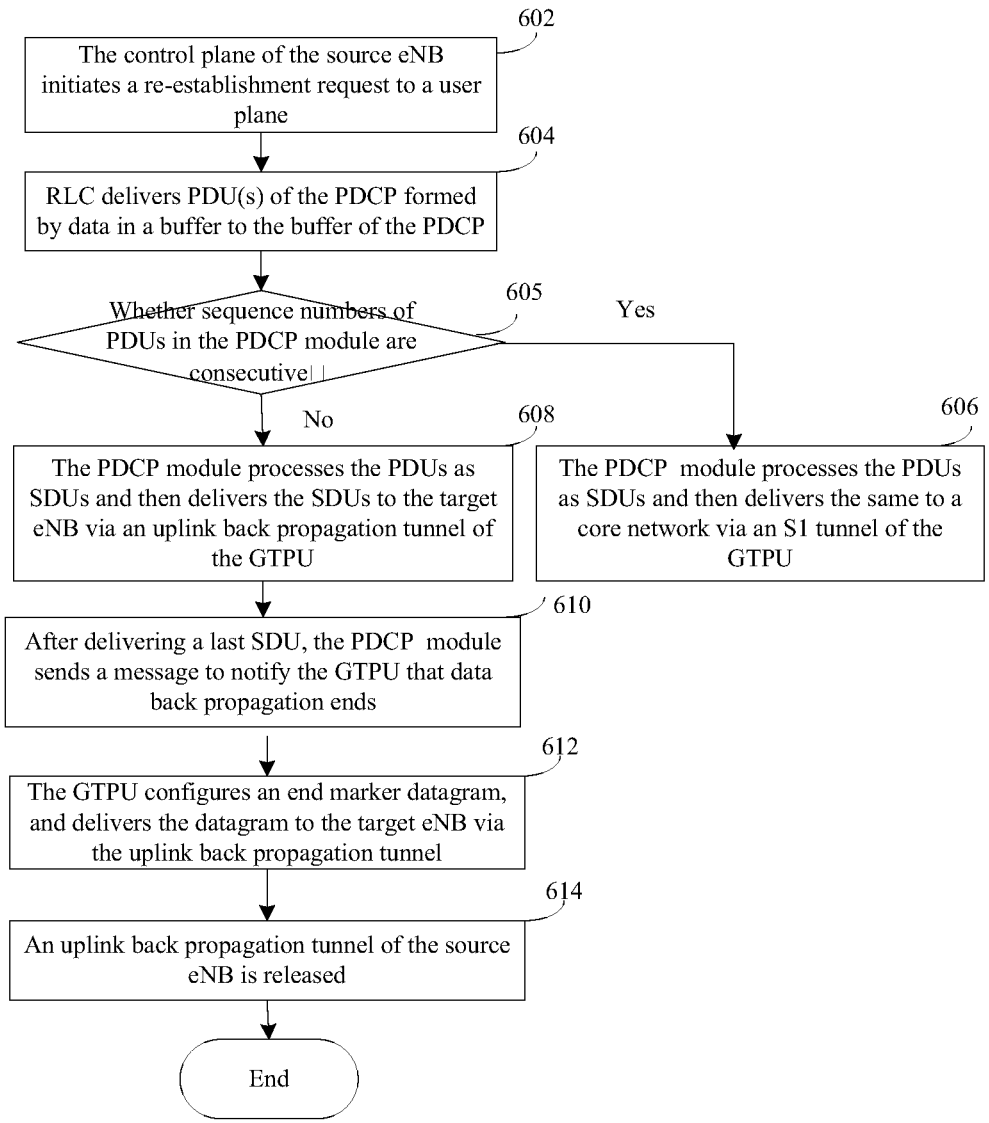
FIG. 6 is a flow chart of a source datagram processing method for determining end time of uplink back propagation in the embodiments of the invention.

After a control plane of an eNB sends a handover command, as shown in FIG. 6, the data processing method of a source eNB during handover comprises the following steps 602 to 614.

Step 602: The control plane of the source eNB initiates a re-establishment request to a user plane.

Step 604: After receiving the re-establishment message, the RLC forms data in a buffer into PDCP PDU(s), and then delivers all the PDUs to a buffer of the PDCP.

Step 605: It is determined that whether the sequence numbers of PDUs in the buffer of the PDCP module is consecutive. If it is determined to be "yes", Step 606 is executed, and if it is determined to be "no", Step 608 is executed.

Step 606: The PDCP module processes PDUs with consecutive SNs in the buffer as SDUs and then delivers the same to a core network via an S1 tunnel of the GTPU.

Step 608: The PDCP module processes PDUs from a PDU with a first inconsecutive SN to the last PDU in the buffer as another SDUs and then delivers the same to a target eNB via an uplink back propagation tunnel of the GTPU.

Step 610: After delivering the last SDU, the PDCP module sends a message to notify the GTPU that the data back propagation ends.

Step 612: The GTPU receives a notification indicating that the data back propagation ends, constructs an end marker datagram, and delivers the datagram to the target eNB via the uplink back propagation tunnel.

Step 614: The uplink back propagation tunnel of the source eNB is released.

Figure 7:
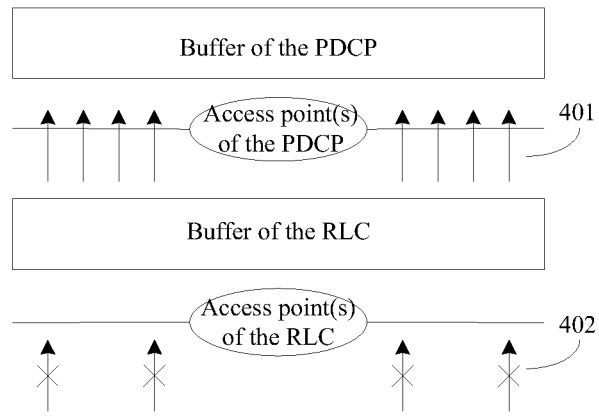
FIG. 7 is a schematic diagram of processing RLC data provided in the embodiments of the invention.

In the above, in the Step 604, as shown in FIG. 7, an RLC re-establishment flow comprises the following steps 702 to 704.

Step 702: The RLC forms data in the buffer into PDCP PDU(s) and then delivers all the PDUs to the buffer of the PDCP module via access point(s) of the PDCP, and discards datagrams that cannot be formed into PDCP PDUs.

Step 704: If the RLC receives uplink data from a bottom layer again, the RLC directly discards the uplink data.

Figure 8:
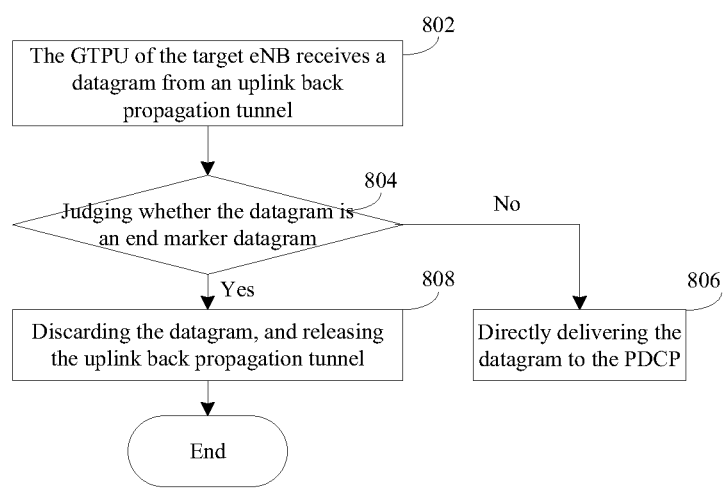
FIG. 8 is a flow chart of a target datagram processing method for determining end time of uplink back propagation in the embodiments of the invention.

As shown in FIG. 8, the data processing method of a target eNB during handover comprises the following steps 802 to 808.

Step 802: The GTPU of the target eNB receives a datagram from an uplink back propagation tunnel.

Step 804: The type of a received datagram is judged. If the message is a data datagram, Step 806 is executed; and if the datagram is an end marker datagram, such as an End Marker datagram, Step 808 is executed.

Step 806: The datagram is directly delivered to PDCP.

Step 808: The end marker datagram is directly discarded, and the uplink back propagation tunnel is released.

In the above present embodiment, the source base station sends the end marker datagram, thus the target base station can accurately determine the end time of the uplink back propagation, such that the release of the uplink back propagation tunnel can be executed timely to ensure that the uplink back propagation data will not be lost during transmission (i.e., releasing the uplink back propagation tunnel too early is avoided), so as to achieve lossless handover, and at the same time, the tunnel resource can be released in time after the back propagation data transmission ends (i.e., releasing the uplink back propagation tunnel too late is avoided), thereby avoiding resource waste.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for determining an end time of uplink back propagation in a mobile communication system, comprising the following steps:

sending, by a source base station, data with consecutive sequence numbers in a buffer of a packet data convergence protocol (PDCP) module to a serving gateway (S-GW) via an S1 tunnel;

sending, by the source base station, data with inconsecutive sequence numbers, which is from data with a first inconsecutive sequence number to last data in the buffer of the PDCP module, to a target base station via an uplink back propagation tunnel;

generating, by the source base station, an end marker datagram after the source base station has sent the data with inconsecutive sequence numbers;

sending, by the source base station, the end marker datagram to the target base station via the uplink back propagation tunnel; and receiving, by the target base station, the end marker datagram and determining that the uplink back propagation has ended.

2. The method according to claim 1, wherein the target base station is an evolved base station.

3. An uplink back propagation method in a mobile communication system, comprising the following steps:

sending, by a source base station, data in a buffer of a radio link control (PLC) module to a buffer of a packet data convergence protocol (PDCP) module;

sending, by the source base station, data with consecutive sequence numbers in the buffer of the PDCP module to a serving gateway via an S1 tunnel;

sending, by the source base station, data with inconsecutive sequence numbers, which is from data with a first inconsecutive sequence number to last data in the buffer of the PDCP module, to a target base station via an uplink back propagation tunnel;

generating, by the source base station, an end marker datagram after the source base station has sent the data with inconsecutive sequence numbers;

sending, by the source base station, the end marker datagram to the target base station via the uplink back propagation tunnel; and receiving, by the target base station, the end marker datagram and releasing the uplink back propagation tunnel.

4. The method according to claim 3, wherein the steps of receiving the end marker datagram and releasing the uplink back propagation channel comprises the following sub-steps:

judging a type of a received datagram;

when the received datagram is a data datagram, storing the data datagram to a reordering buffer; and when the received datagram is an end marker datagram, releasing the uplink back propagation tunnel.

5. The method according to claim 3, wherein, after sending the data in the buffer of the RLC module to the buffer of the PDCP module, if the RLC module receives uplink data from a bottom layer again, the RLC module discards the uplink data.

6. The method according to claim 3, wherein the target base station is an evolved base station.

7. A system for determining an end time of uplink back propagation in a mobile communication system, comprising a source base station and a target base station, wherein the source base station comprises:

a consecutive data sending unit, configured to send data with consecutive sequence numbers in a buffer of a packet data convergence protocol (PDCP) module to a serving gateway via an S1 tunnel;

an inconsecutive data sending unit, configured to send data with inconsecutive sequence numbers, which is from data with a first inconsecutive sequence number to last data in the buffer of the PDCP module, to a target base station via an uplink back propagation tunnel; and an end marker datagram sending unit, configured to generate an end marker datagram after the inconsecutive data sending unit has sent the data with inconsecutive sequence numbers, and to send the end marker datagram to the target base station via the uplink back propagation tunnel; and a destination base station is configured to receive the end marker datagram and determine that the uplink back propagation has ended.

8. The system according to claim 7, characterized in that the source base station further comprises a storage unit, as the buffer of the PDCP module, configured to store the data with consecutive sequence numbers and the data with inconsecutive sequence numbers.

9. The system according to claim 7, wherein the target base station comprises:

a datagram type judging unit, configured to judge a type of a received datagram; and a datagram processing unit, configured to, when the received datagram is a data datagram, store the data datagram to a reordering buffer; and when the received datagram is an end marker datagram, release the uplink back propagation tunnel.

10. The system according to claim 7, wherein the target base station is an evolved base station.

11. The method according to claim 4, wherein the target base station is an evolved base station.

12. The method according to claim 5, wherein the target base station is an evolved base station.

13. The system according to claim 8, wherein the target base station is an evolved base station.

14. The system according to claim 9, wherein the target base station is an evolved base station.

* * * * *